United States Patent [19]

Latvus

[11] Patent Number: 4,524,283
[45] Date of Patent: Jun. 18, 1985

[54] ENERGY CONVERTER

[75] Inventor: Väinö P. Latvus, Helsinki, Finland

[73] Assignee: Innovex Oy, Helsinki, Finland

[21] Appl. No.: 505,352

[22] Filed: Jun. 16, 1983

[30] Foreign Application Priority Data

Jun. 18, 1982 [FI] Finland .................................. 822200

[51] Int. Cl.³ .............................................. F03G 1/00
[52] U.S. Cl. ..................................... 290/1 E; 290/53;
290/54; 290/55; 185/11; 185/30
[58] Field of Search ..................... 290/1 E, 42, 53, 43,
290/44, 54, 55; 417/328; 185/6, 7, 10, 11, 29,
30, 40 R, 40 B

[56] References Cited

U.S. PATENT DOCUMENTS

| | | | |
|---|---|---|---|
| 2,341,633 | 2/1944 | Ljungström | 185/40 R |
| 3,631,670 | 1/1972 | Vassilakis | 74/88 |
| 3,794,852 | 2/1974 | Willis | 290/1 E |
| 4,024,409 | 5/1977 | Payne | 290/55 |
| 4,228,360 | 10/1980 | Navarro | 290/53 |
| 4,242,050 | 12/1980 | Oakes | 290/55 |

Primary Examiner—Vit W. Miska
Assistant Examiner—Shelley Wade
Attorney, Agent, or Firm—Lowe, King, Price & Becker

[57] ABSTRACT

Described herein is a device for converting such forms of mechanical energy that comprise even slow and random movements, such as the waves of the sea, the flow of a river, the blowing of the wind, and the thermal expansion caused by the radiation of the sun, to a more useful form of high-speed rotation. The device comprises a shaft member rotatable in one direction only in relation to a frame and comprising a crank. A longitudinal actuating member is at one end connected to the shaft member and arranged to rotate the shaft member by means of its movements in relation to the frame. A spring connected at one end to the frame and at the other end to the crank stores the potential energy caused by the movements of the actuating member and releases it by causing the crank to turn the shaft member into rotation when the crank has passed a dead point determined by the actuating direction of the spring.

9 Claims, 16 Drawing Figures

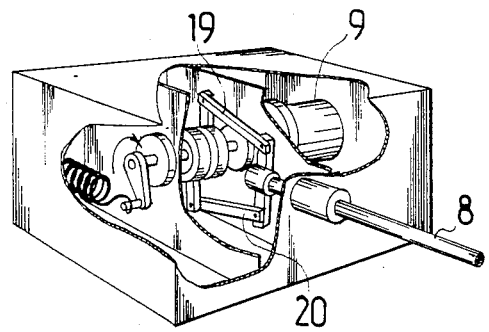
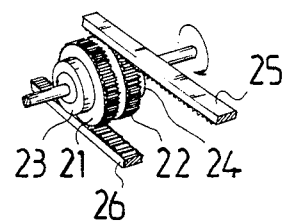
Fig. 6
Fig. 7
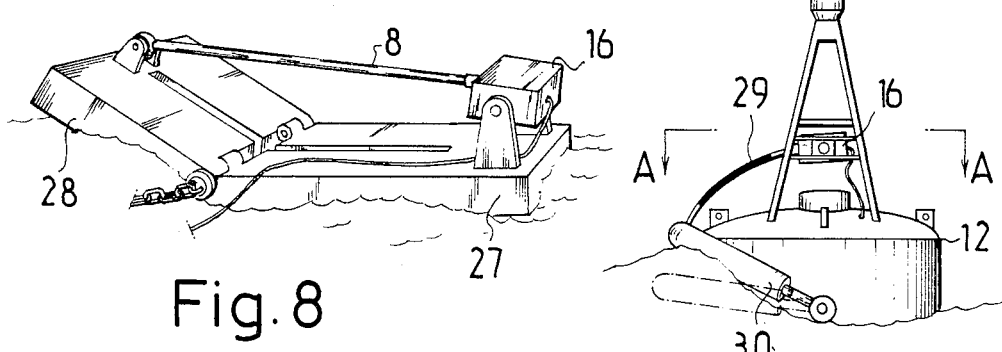
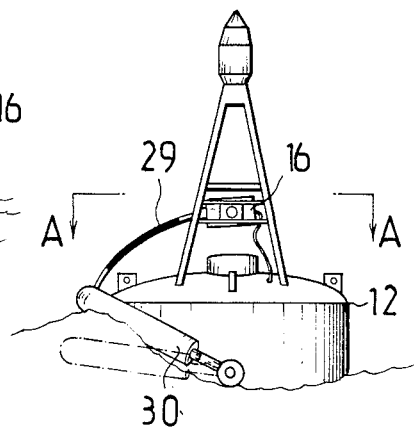
Fig. 8
Fig. 9
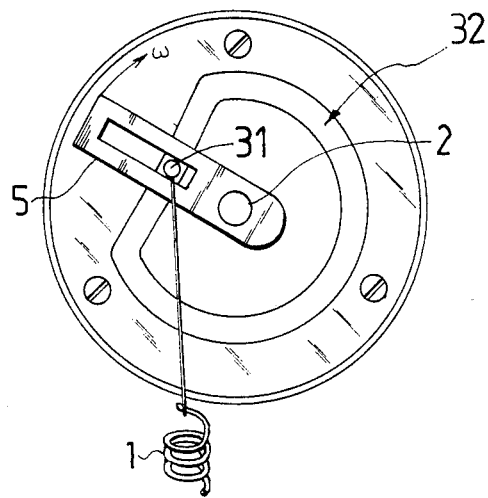
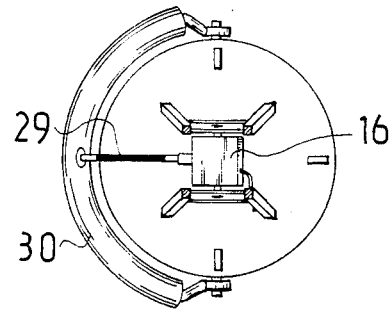
Fig. 11
Fig. 10

ENERGY CONVERTER

This invention relates to a device for converting such forms of mechanical energy that comprise even slow and random movements, such as ocean waves flow, river, wind, and thermal expansion caused by solar radiation, to a more useful form of high-speed rotation, whereby the energy can be utilized effectively by means of an electric generator, special pumps and the like.

Such devices can be used for example for charging storage batteries in navigational aids, sailing boats, holiday cabins, radio link stations, remote electronic control applications, and weather observation stations.

Prior art energy converters of the above type are based on hydraulic and pneumatic elements, gearing or complicated special generators. The suggested systems for providing a link between the energy catching mechanism and the electric generator are complicated and expensive, with a low efficiency, especially in small units.

It is the object of the present invention to provide an energy converter with high efficiency, achieved with a simple and low cost construction.

In the converter according to the invention a strong spring and a crankshaft stretching it act on one side as an energy storing unit and on the other side as the driving element of the generator or, for instance, a centrifugal pump. The input power turns the crankshaft by means of at least one articulated lever, coupled to the crankshaft by means of a freewheel. When the crankshaft has reached its uppermost position and the spring has stretched to its set maximum length, the spring starts to run the crankshaft and the generator connected to it. The capacity of the generator and the amount of energy stored in the spring are chosen such that the angular velocity achieved is high enough for a conventional generator to convert the main part of this mechanical energy to electrical energy during the first three quarters of its turn. The produced current pulse can be stored in a battery, if necessary through a filter.

The output of the converter can be increased by replacing the lever arrangement by two geared rod/wheel units where the wheels are equipped with freewheels. Pushing and pulling of the rod turns the crankshaft in the same direction.

For a more stabilized current form and for minimizing the number of strain peaks on the spring and the freewheels, the following variations may be designed:

If the generator is coupled to the crankshaft by means of a freewheel and also equipped with a flywheel, the spring energy can be almost totally transformed to kinetic energy of the flywheel. The freely running generator converts it to electricity before the next shot of the spring increases its velocity. The charging current becomes thus more even.

By increasing the amount of spring energy, no longer so limited by the capacity of the generator, the number of necessary shots and strain peaks for each watt-hour can be reduced.

A convenient maximum size of the converter is a few kilowatts.

Being a power source with high operational reliability, the converter in its most simple form provides an economical solution for, e.g., lightbuoys.

The invention will be illustrated in more detail by the following examples, reference being made to the attached drawings.

FIGS. 3a-f illustrate the conversion of sequential mechanical energy batches to electric energy and also the form of the angular speed of the crankshaft during the discharging period of a spring.

Figure 4:
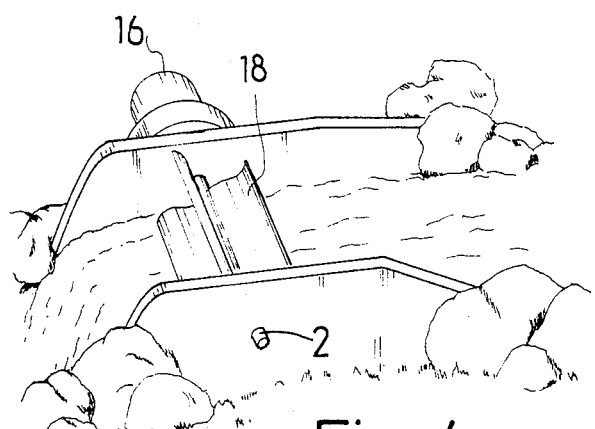

FIG. 4 shows an application of the invention in rotating access.

Figure 5:
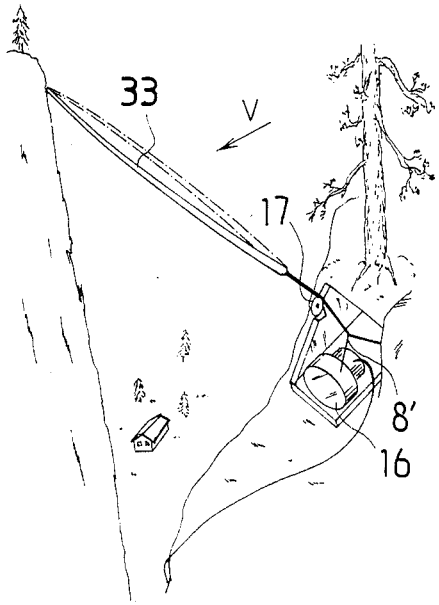

FIG. 5 shows an application of the invention in a fluttering airfoil generator.

FIG. 6 shows an embodiment of the invention with two levers.

FIG. 7 shows an embodiment of the converter with a rod/gear arrangement.

FIG. 8 shows an application of the invention for utilizing wave energy.

FIG. 9 shows an application of the invention for charging the batteries in a navigational buoy.

FIG. 10 is a cross section of the embodiment of FIG. 9 taken along the line A—A.

FIG. 11 shows a crankshaft arrangement for levelling the torque peak caused by the spring.

Figure 1:
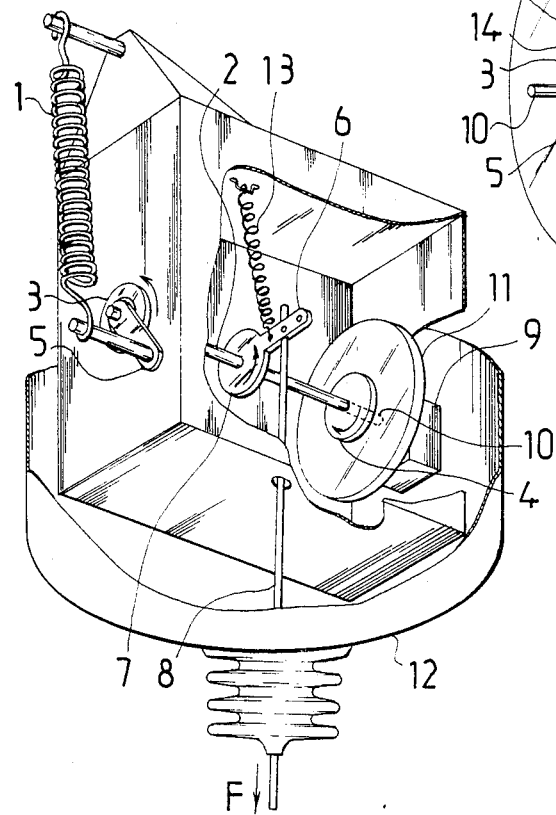
FIG. 1 shows a converter according to the invention, applied to a floating buoy.

The energy converter according to FIG. 1 comprises the following major parts: a main spring 1, a crankshaft 2, its freewheels 3 and 4, a crank 5, a lever 6, its freewheel 7, a rod 8, a generator 9, its shaft 10, and a flywheel 11.

The converter is encapsuled watertightly in a buoy 12 floating on the waves. A large plate (not shown) is fixed at the lower end of the rod 8. When a wave heaves the buoy 12, the plate hinders the rod 8 to follow the buoy and the converter in it.

The relative motion between the rod 8 and the converter turns the lever 6 and the crankshaft 2 by means of the freewheel 7. The freewheel 7 releases the lever 6 from the crankshaft 2 when the buoy 12 follows the wave down. The lever 6 is equipped with a restoring spring 13 necessary in some operational circumstances.

The turning angle of the crank 5 during each pull of the rod 8 depends mainly on the height of the wave, the stiffness of the spring 1, the length of the arms of the crank 5 and the lever 6, the diameter of the buoy 12 and the plate. Only up-heaving motions can be utilized.

A turning back of the crankshaft 2 is avoided in this type of converter by using a freewheel 3 at the bearing of the crankshaft 2. When the spring 1 starts to run the crankshaft 2 after its lowermost position, the freewheel 4 couples it to the generator shaft 10.

The freewheel 4 transmits energy from the spring 1 to the flywheel 11 until the spring 1 starts to get charged again from the rotating energy of the crankshaft 2. The generator 9 converts most of the energy in flywheel 11 before the next shot of the spring 1.

Figure 3A:
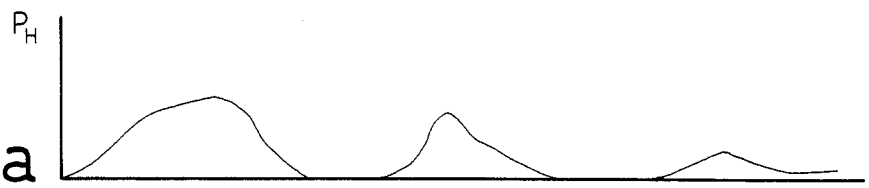
Figure 3B:
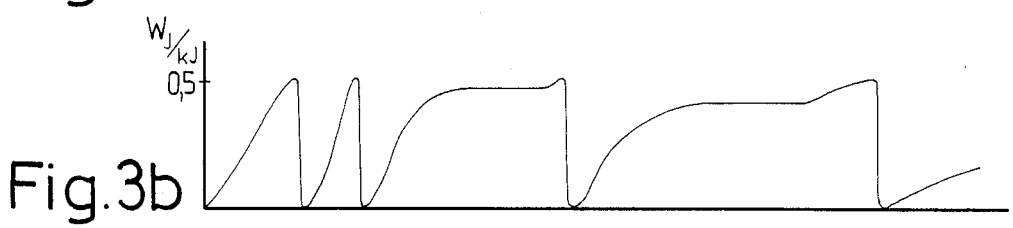
Figure 3C:
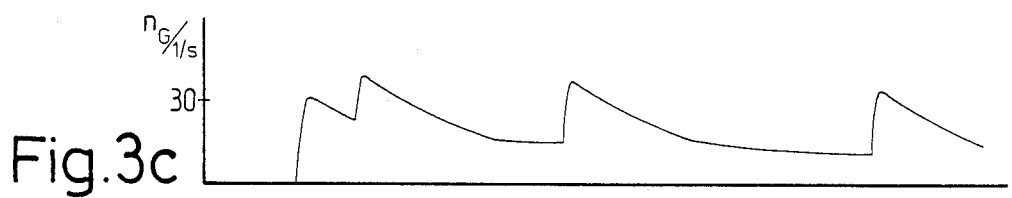
Figure 3D:
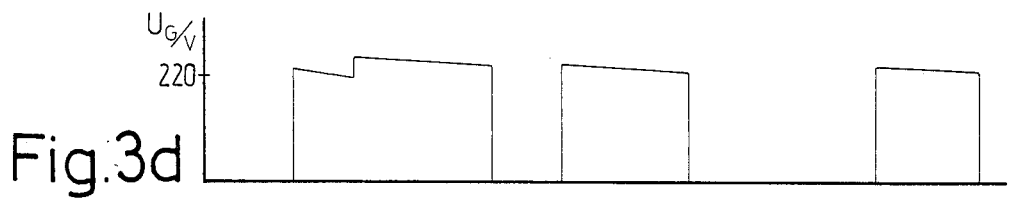

The magnetization current of the generator 9 can be switched on just when the angular velocity of the shaft 10 is high enough (see FIG. 3d). The energy left in the flywheel 11 after switching off the current adds energy of the next shot.

In a more simple embodiment of the converter the generator 9 has no flywheel and is coupled directly to the crankshaft 2. In this case the capacity of the generator 9 and the amount of spring energy is chosen such that the generator 9 is able to convert a major part of this energy to electricity during just over half a turn of the crankshaft 2. The rest of the rotational energy gets stored back in the spring 1 for a next shot.

While passing the point of maximum moment caused by the spring 1, the buoy 12 sinks deeper into the water, and the stored potentional energy gets released, turning the crankshaft. The point of maximum moment occurs about 90 degrees before the uppermost position of the crank 5 and decreases sharply just before the uppermost position. For arrangements to avoid high torque peaks, reference is made to FIG. 11.

Figure 2:
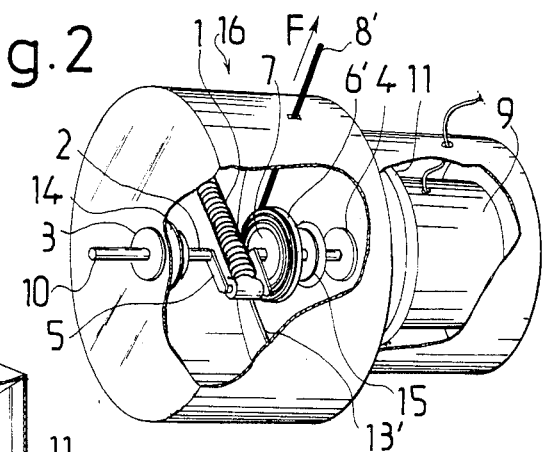
FIG. 2 shows an embodiment of the converter comprising a compression spring and a reel jack.

In FIG. 2, the crankshaft 2 is turned and the compression spring 1 compressed by pulling of the belt 8' on the reel 6' equipped with a spiral type restoring spring 13'. Pulling motions can thus be lengthened by using the reel.

In FIGS. 3a-f, the following quantities are illustrated as functions of time with approximated values of elements chosen: Spring coefficient of the spring 1 (k=4 N/mm), stretch of the spring 1 (s=150 mm), inertia of the flywheel 11 (I=1000 gm$^2$), storage battery 220V/10Ah.

FIG. 3a : The series of sequential batches of mechanical power available.

FIG. 3b : The amount of potentional energy stored in the spring 1.

FIG. 3c : The angular velocity of the shaft 10 of the generator 9.

FIG. 3d : The controlled output voltage of the generator 9.

Figure 3E:
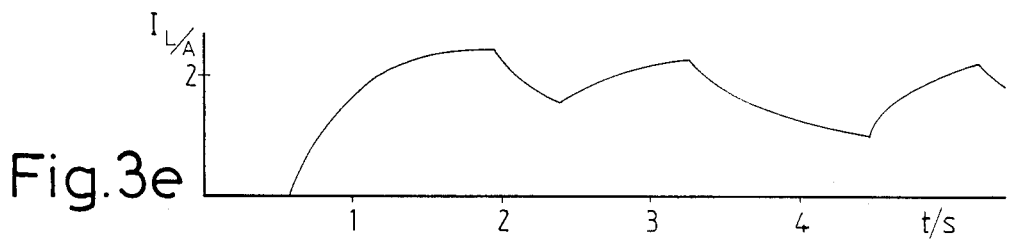

FIG. 3e : The filtered charging current.

Figure 3F:
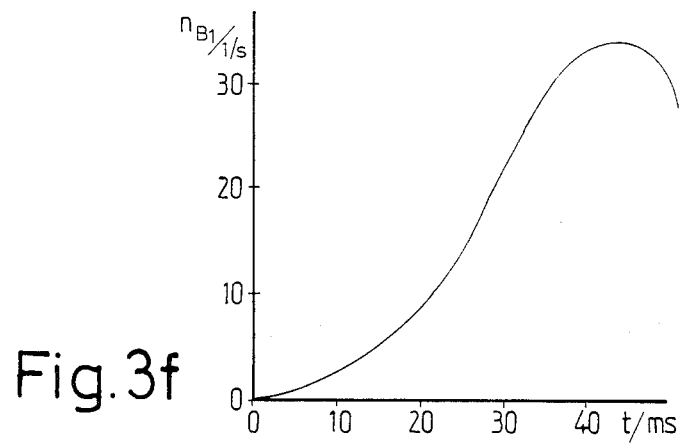

FIG. 3f : The angular velocity of the crankshaft 2 and the generator 9 during the discharging period of the spring 1.

In FIG. 4, the crankshaft 2 is extended like in the embodiment in FIG. 2. From this design, however, one freewheel and the reel or lever are missing. The extension of the crankshaft 2 is connected to a waterwheel 18 which turns it by means of a freewheel causing two "shots" of the spring during each turn.

In FIG. 5, the fluttering airfoil 33 crossing the valley pulls the belt 8' like in FIG. 2 and causes two strokes during each full period of fluttering.

In FIG. 6, the acting rod 8 is fixed to two articulated levers 19, 20 which both turn the crankshaft by means of their own freewheels. Both pulling or pushing of the rod 8 turns the crankshaft in the same direction.

In FIG. 7 is illustrated a rod/gear arrangement as a further design for certain applications of the embodiment in FIG. 6. This arrangement replaces two levers and extends the moving dimension of the rod. Both gears 21, 22 are equipped with their own freewheels 23, 24. This arrangement makes a freewheel as well as the two levers 19, 20 in FIG, 6 unnecessary.

In FIG. 8, the converter illustrated in FIGS. 6 and 7 is used in a wave energy harnessing raft 27, 28, for instance, for charging a battery on the shore.

In FIG. 9, the navigational buoy 12 is equipped with a converter 16 as illustrated in FIG. 6. A hinged massive half ring 30 floats around the floating buoy 12 and follows it with a sufficient phase shift in order to produce power to the arcuate transmitting rod 29 at the energy converter 16. Batteries for navigational or other instruments inside the buoy 12 are charged by the converter 16.

In FIG. 11, there is illustrated an arrangement to level high torque peak caused by the spring 1 by means of the crank 5. The length of the crank 5 is reduced when positioned in the direction where the spring torque has its highest value. This is realized by guiding the bearing pin 31 of the spring 1 sliding in the crank 5 through an eccentric groove 32. The peak torque thus can be halved.

What I claim is:

1. Device for converting mechanical energy of a type including slow or random movements into rotational energy, comprising:
    a frame,
    a crankshaft rotatable in one direction only in relation to the frame, said crankshaft including a crank;
    a pair of freewheels arranged on the crankshaft and being operable to rotate in opposite directions about the crankshaft;
    a longitudinal actuating member reciprocatingly movable in its longitudinal direction in relation to the frame and operatively connected at one end to both flywheels to rotate the crankshaft during movement of the actuating member in both directions; and a spring connected at one end to the frame and at the other end to the crank for storing the potential energy by causing the crank to rotate the crankshaft when the crank has passed a dead point determined by the actuating direction of the spring.

2. A device as claimed in claim 1, wherein the actuating member is a rod.

3. A device as claimed in claim 1, wherein the actuating member is a belt.

4. A device as claimed in claim 1, wherein the actuating member is a shaft.

5. The device of claim 3, wherein said belt is connected to a fluttering air foil mounted to longitudinally reciprocate the actuating member when said fluttering air foil is positioned in wind.

6. A device as claimed in claim 1, further comprising a generator connected to the crankshaft for generating electrical energy.

7. A device as claimed in claim 1, wherein the actuating member is connected to the freewheels by means of articulated levers.

8. A device as claimed in claim 1, wherein the actuating member is connected to the freewheels by means of a rod/gear arrangement.

9. A device as claimed in claim 1, wherein
    the crank includes a radial guiding slot and a pin slidably arranged in the slot;
    the spring is connected at its other end to the pin; and
    an eccentric annular groove is provided for guiding the pin along an eccentric path in order to reduce the peak torque when the crank is rotated.

* * * * *